United States Patent

Mignet et al.

(10) Patent No.: US 7,599,969 B2
(45) Date of Patent: *Oct. 6, 2009

(54) METHOD AND SYSTEM FOR SCHEDULING WORKLOAD IN DATABASES

(75) Inventors: Laurent Sébastien Mignet, New Delhi (IN); Sourashis Roy, New Delhi (IN); Torsten Steinbach, Holzgerlingen (DE); Ranga Raju Vatsavai, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 238 days.

This patent is subject to a terminal disclaimer.

(21) Appl. No.: 11/613,307

(22) Filed: Dec. 20, 2006

(65) Prior Publication Data

US 2008/0155545 A1    Jun. 26, 2008

(51) Int. Cl.
G06F 17/30    (2006.01)
G06F 9/40    (2006.01)
G06F 11/00    (2006.01)

(52) U.S. Cl. .................. 707/202; 707/2; 707/3

(58) Field of Classification Search ............ 707/2, 707/3, 202
See application file for complete search history.

(56) References Cited

U.S. PATENT DOCUMENTS

| | | | |
|---|---|---|---|
| 6,542,893 | B1 | 4/2003 | Quernemden |
| 6,732,124 | B1 | 5/2004 | Koseki et al. |
| 6,944,711 | B2 | 9/2005 | Mogi et al. |
| 7,302,455 | B1* | 11/2007 | Cordsmeyer et al. ........ 707/206 |
| 2003/0208464 | A1* | 11/2003 | Lee et al. ...................... 707/1 |
| 2005/0234842 | A1* | 10/2005 | Lau et al. ...................... 707/1 |

FOREIGN PATENT DOCUMENTS

KR    2001028113 A  *  4/2001

OTHER PUBLICATIONS

"*Database log file storage*", International Business Machines. (http://publib.boulder.ibm.com/infocenter/cmod/v8r3m0/index.jsp?topic=/com.ibm.ondemand.mp.doc/ars1p171136.htm), Dec. 15, 2006.
"*SQL Server 6.5 Optimization Tips*", Sequel Server Worldwide Users Group. (http://www.mssqlcity.com/Tips/tipSQL65.htm), Dec. 15, 2006.
"*Database Resource Planning*", Microsoft Corporation. (http://msdn2.microsoft.com.en-us/library/ms166482.aspx), Dec. 15, 2006.

(Continued)

*Primary Examiner*—James Trujillo
*Assistant Examiner*—William Spieler
(74) *Attorney, Agent, or Firm*—Gibb I.P. Law Firm, LLC

(57) ABSTRACT

A method for scheduling a workload comprising a plurality of transactions relating to a database management system is disclosed. The method comprises the steps of determining a log space amount required by each transaction in the workload, estimating the total log space required for executing the workload based on the log space amounts required by each transaction, and scheduling execution of the workload based on the estimated total log space.

1 Claim, 6 Drawing Sheets

OTHER PUBLICATIONS

"*Tips for Performance Tuning SQL Server Database Settings*", SQL-Server-Performance.Com. (http://www.sql-server-performance.com/database_settings.asp),Feb. 20, 2006.

"*How to Estimate the Database Size for Site Server Analysis*", Microsoft Corporation. (http://support.microsoft.com/kb/q216559/), Nov. 10, 2000.

Ferreto, T., De Rose, C., and Northfleet, C., "*Scheduling BoT Applications in Grids Using a Slave Oriented Adaptive Algorithm*", Springer Berlin/Heidelberg, Parallel and Distributed Processing and Applications, vol. 3358/2004, copyright 2004, pp. 392-398, ISBN 978-3-540-24128-7. (www.springerlink.com/index/8D4EEMPKGT9TL42A.pdf).

Feitselson, D. G., "*Metrics for Parallel Job Scheduling and Their Convergence*", Springer Berlin/Heidelberg, Job Scheduling Strategies for Parallel Processing: $7^{th}$ International Workshop, JSSPP 2001, Cambridge, MA, USA, Jun. 16, 2001, Revised Papers, p. 181. (www.springerlink.com/index/YQW8HMNLET36PK1.pdf).

Smith, W., Taylor, V., and Foster, I, "*Using Run-Time Predictions to Estimate Queue Wait Times and Improve Scheduler Performance*". (www.globus.org/alliance/publications/papers/p.pdf), Dec. 20, 2006.

Covreur, J., "Curiosity is Bliss: Scheduling Your Network Connections (SYNC)", Jan. 26, 2004. (http://blog.monstuff.com/archives/000133.html).

* cited by examiner

METHOD AND SYSTEM FOR SCHEDULING WORKLOAD IN DATABASES

FIELD OF THE INVENTION

This invention relates to scheduling workloads in database transactions and more particularly to prevention of transaction failures due to insufficient log space.

BACKGROUND

Workloads submitted to database management systems (DBMSs) typically consist of multiple transactions, which may consist of multiple structured query language (SQL) queries. While processing a transaction, the database engine records actions performed in a log, which enables enforcement of the Atomicity, Consistency, Isolation, and Durability (ACID) properties of the transaction. Atomicity refers to the ability of a DBMS to guarantee that either all of the tasks of a transaction or none of them are performed. Consistency refers to a DBMS being in a legal or allowed state when a transaction begins and ends. Isolation refers to the ability of an application to make operations in a transaction appear isolated from all other operations. Durability refers to a guarantee that, once a user has been notified of success of a transaction, the transaction will persist and will not be undone. Typically, transactions recorded in the log can be replayed to return the DBMS to its state just prior to a failure.

A transaction can only be deemed committed after being safely included in the transaction log. The transaction log is typically stored in a log space on a data storage device, the size of which is pre-determined or selectable by a user. Upon completion of a transaction and the necessary changes to the data, the database engine frees up the space occupied by the transaction log relating to that particular transaction. However, if a database engine runs out of log space, transactions already performed are cancelled, which results in a waste of computing time and resources. As it is desirable to execute workloads without user or human supervision (e.g., overnight), a need exists to prevent database engines from running out of log space.

A common remedy attempted to avoid running out of log space is to use as large a log space as possible. However, this approach suffers from significant disadvantages. Either the log space size has to be manually configured before each workload or a large portion of storage has to be permanently reserved to provide sufficient log space for the largest conceivable workload. Both of the foregoing are a waste of resources and the very real possibility exists that manual configuration may be forgotten. Furthermore, in the event of a crash, the cost of performing a database rollback with a large transaction log is substantial.

U.S. Pat. No. 6,542,893, entitled "Database sizer for pre-emptive multitasking operating system", issued to Quernemoen on Apr. 1, 2003 and is assigned to Unisys Corporation. This document relates to software for sizing relational database management systems (RDBMSs) and, more particularly, to methods for determining the required size for database storage.

U.S. Pat. No. 6,732,124, entitled "Data processing system with mechanism for restoring file systems based on transaction logs", issued to Koseki, et al. on May 4, 2004 and is assigned to Fujitsu Limited. This document relates to a data processing system which can recover from system failures by using log records to restore the consistency of its file system structure.

U.S. Pat. No. 6,944,711, entitled "Cache management method for storage device", issued to Mogi, et al. on Sep. 13, 2005 and is assigned to Hitachi, Ltd. This document relates to cache space settings on a storage device in a computer system for running a database management system (DBMS).

Certain existing DBMSs such as Microsoft SQL Server include an "auto grow" feature, which may be used to reduce the potential of running out of transaction log space. If this feature is enabled without imposing any maximum storage space limit, the system will continue growing the log space in accordance with current requirements until no more physical storage space is available, at which point, the transaction/s will fail. Use of the "auto grow" feature with a large storage space limit simply results in the possibility of aborted processing of a relatively larger workload.

Accordingly, a need exists for improved and/or efficient methods, systems and products for efficiently managing transaction log space for scheduling workloads in database management systems.

SUMMARY

Aspects of the present invention relate to methods, systems and products for efficiently managing transaction log space for scheduling workload in database management systems.

An aspect of the present invention provides a method for scheduling a workload comprising a plurality of transactions relating to a database management system. The method comprises the steps of determining an amount of log space required by each transaction in the workload, estimating total log space required for executing the workload based on the amount of log space required by each transaction, and scheduling execution of the workload based on the estimated total log space. The step of scheduling execution of the workload may comprise scheduling execution of each transaction in the workload and/or determining an appropriate time to execute each of the transactions. Execution of the transactions may be scheduled such that the estimated total log space required for executing the workload is less than the amount of available log space.

A further aspect of the present invention provides a system, preferably a computing system, for scheduling a workload comprising a plurality of transactions relating to a database management system. The system comprises a memory unit for storing data and instructions to be performed by a processing unit and a processing unit coupled to the memory unit. The processing unit is configured to perform the steps of the method described above.

A further aspect of the present invention provides a product comprising a processing means configured for scheduling a workload comprising a plurality of transactions relating to a database management system. The product is configured for performing the steps of the method described above.

BRIEF DESCRIPTION OF THE DRAWINGS

A relatively small number of embodiments are described hereinafter, by way of example only, with reference to the accompanying drawings in which.

DETAILED DESCRIPTION

Figure 1:
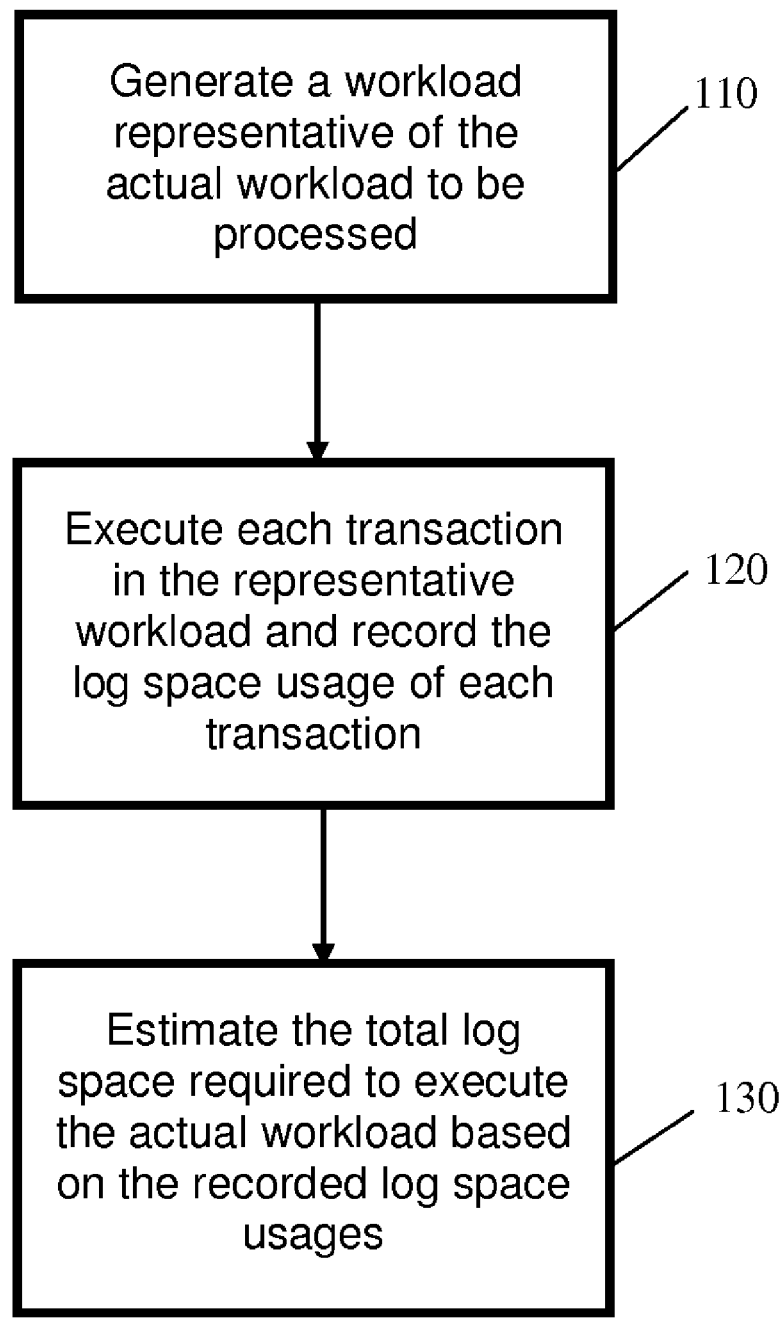
FIG. 1 is a flow diagram of a method for determining an amount of log space required for a workload comprising a plurality of transactions.

Embodiments of systems, methods, and products are described hereinafter for log space management in databases to schedule workload efficiently. While the embodiments described hereinafter have specific application to databases, the embodiments may have application to other data and/or data structures and it is not intended that the present invention be limited to the particular embodiments described hereinafter.

As described hereinbefore, a database workload typically comprises transactions comprising queries such as Structured Query Language (SQL) queries. When such transactions are executed by a database engine, each of the transactions consumes a portion of the transaction log space. The amount of transaction log space consumed is dependent on the type of transaction, as well as the amount of data manipulation/changes performed by the database engine when executing the transaction. The transactions may be executed sequentially or in parallel.

Log space used by or reserved for a transaction may be released by the database engine once the transaction is completed or aborted, or when a commit or roll back relating to the workload occurs. A commit is an instruction to a DBMS to validate any changes performed by the transaction, while a roll back cancels all changes made to the status of the database as a result of the transaction.

For the case of sequential transactions, the maximum log space required for a particular workload to be processed is generally the maximum of the log space required by each of the individual transactions.

For the case of parallel transactions, the maximum log space required for a particular workload to be processed is generally the sum of the log space required by each of the transactions (i.e., transactions that are executed simultaneously or partially simultaneously). Log space used by the transaction may be released when a commit or roll back is executed for that transaction.

More specifically, transaction log space may only be released when all the queries of a currently active transaction have been completed. Thus, if a particular query completes but another query of the same transaction is still being executed and has log entries, the log space is not released. This requires summing of the log spaces required by each query to be executed between the beginning and end times of the transaction. The summation is performed for each transaction still active at the end of a transaction in order of the end time of the remaining transactions, and results in a set of chunks. Each chunk is checked to determine which transactions are active during the chunk and the log space required (i.e., the sum of the log space required for each transaction in the chunk). The maximum log space required for the entire workload is the maximum log space required by the individual chunks.

Certain embodiments of this invention require determination or estimation of the amount of log space currently used and/or the amount of available log space. Log space used and available log space may be determined or estimated by interrogating database variables. For example, in IBM's DB2™ Universal Database Application, the maximum amount of log space that can be used for a particular database may be computed using the formula: ([logprimary]+[log second])*[logfilsiz], where the variables in square brackets [ ] represent the database configuration parameters. Further information in this regard may be obtained from the IBM DB2™ Universal Database Administration Guide: Performance version 8, pages 454-455.

In DB2, the sensor (variable) total_log_used returns the total amount of active log space currently used in bytes by the database. Further information in this regard may be obtained from the IBM DB2™ Systeme Monitor Guide and Reference, version 8, page 294.

The log space required for executing a transaction comprises the sum of the log space required for each query in the transaction. Various methods may be used to estimate or determine the log space required to process a query. For example, an estimate of the log space required to perform the query may be determined using a "Domain Expert" approach or a "learning approach".

In the "Domain Expert" approach, the DBMS provides estimates of the amount of log space required to perform various database operations. For example, IBM's DB2™ Universal Database Engine includes encoded formulae that provide accurate estimates of the log space required to perform database operations, such as DELETE, INSERT, UPDATE and CREATE.

Under the "learning approach", a query is created for each table in the database and sequentially executed. By gathering the log usage before and after execution of the queries (or before a commit, depending upon the configuration of the database), an estimate of the log space required for each query to be executed/processed may be determined. This information may subsequently be used in a real data processing scenario by referencing the corresponding size for each query/table in the real scenario.

The methods described hereinafter with reference to FIGS. 1 and 2 relate to the "learning approach" and "Domain Expert" approach referred to hereinbefore, respectively. The methods for example may be advantageously performed by a software program external to the DBMS or may form part of a software module sitting on top of the DBMS, such as a query patroller.

FIG. 1 is a flow diagram of a method for determining an amount of log space required for a workload comprising a plurality of transactions.

At step 110, a representative workload is generated, which is representative of the actual workload to be processed by the database engine. The representative workload may, for example, be generated by a software application such as IBM's DB2™ Performance Expert.

At step 120, the representative workload is executed (e.g., each transaction of the representative workload is executed sequentially) and the log space usage is recorded. Execution of the representative workload may be as simple as executing a database operation for each table of the database to estimate the log space needed to execute the particular operation. For example, an UPDATE operation may be executed for each table of the database to estimate the log space needed to update one tuple for an UPDATE query. Other database operations such as DELETE and INSERT may similarly be executed to provide an estimate of the amount of log space required. The log space usage may be recorded by means of a learning approach (e.g., a learned model), which may optionally be validated by a user of the database management system. That is, a user may manually modify the estimated amount of log space required for a particular query (e.g., in case of inaccuracies in the model).

At step 130, the total log space required to execute the actual workload is estimated based on the recorded log space usages, so that the workload can be scheduled accordingly.

Figure 2:
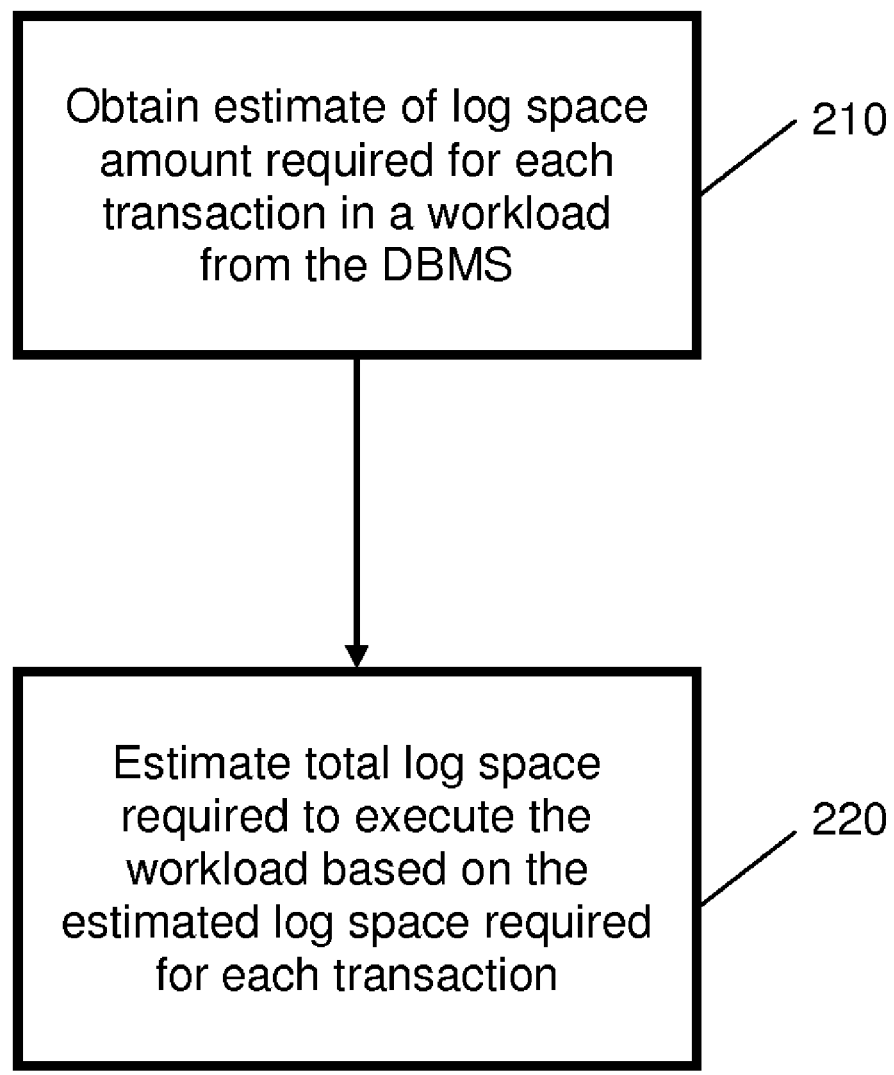
FIG. 2 is a flow diagram of another method for determining an amount of log space required for a workload comprising a plurality of transactions.

FIG. 2 is a flow diagram of another method for determining an amount of log space required for a workload comprising a plurality of transactions.

At step 210, estimated log space usage for each transaction in the workload is obtained from the DBMS (stored as domain expert knowledge). For example, in IBM's DB2™ Universal Database, an estimate of the amount of log space required for a transaction may be obtained by a Query Optimizer based on the number of database rows that the transaction will process. Information relating to the number of rows is determined based on statistics of the table involved in the transaction using a computational algorithm. The estimated log space usage may be recorded by means of a learned model, which may optionally be validated by a user of the database management system. That is, a user may manually modify the estimated amount of log space required for a particular query (e.g., in case of inaccuracies in the model).

At step 220, the total log space required for the actual workload is estimated based on the log space required for each transaction in the workload.

Figure 3:
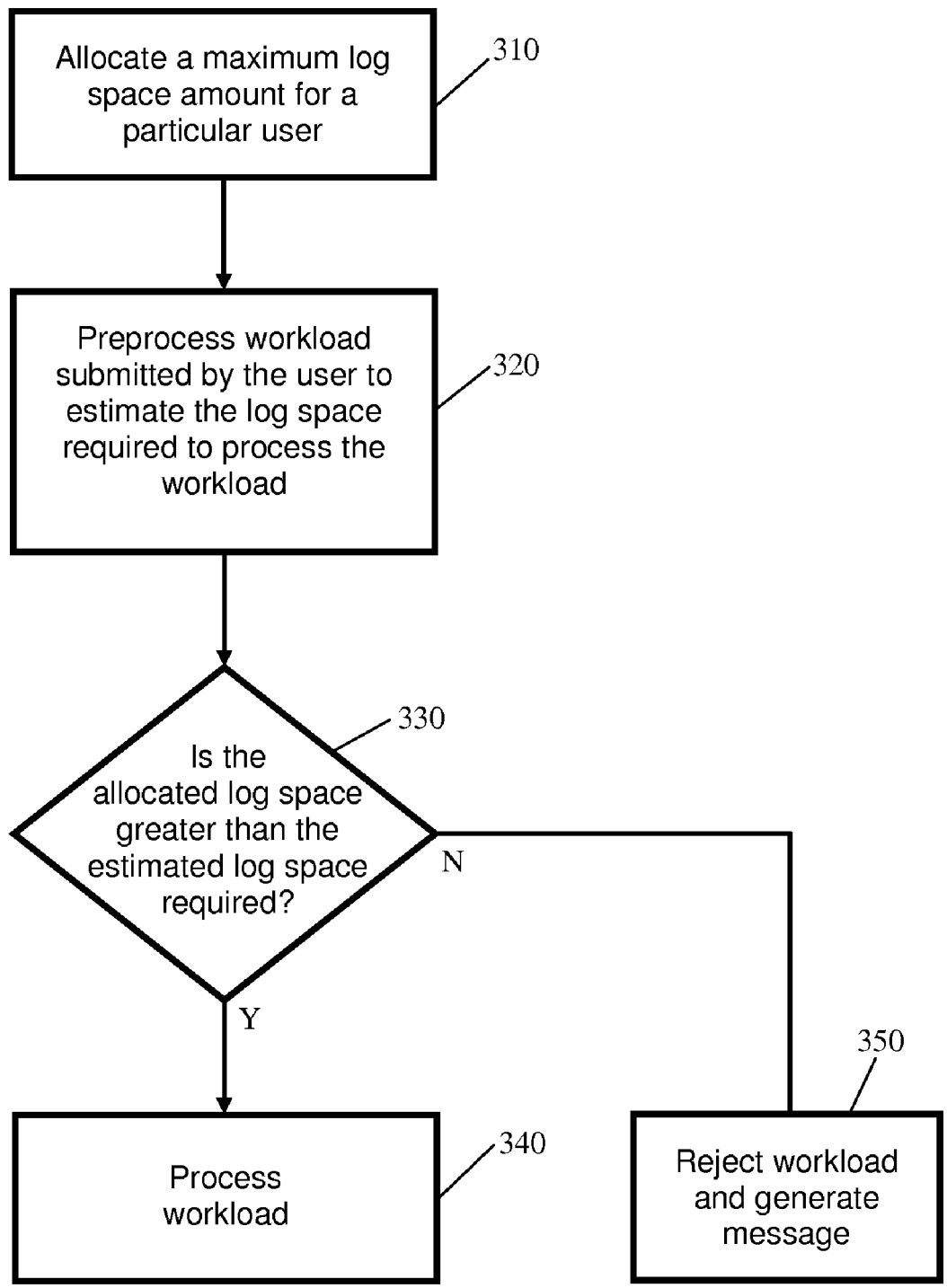
FIG. 3 is a flow diagram of a method for managing log space in a computer database.

FIG. 3 is a flow diagram of a method for managing log space in a database, for example a computer database.

At step 310, a maximum log space amount is allocated for a particular user. This implies that a workload submitted by the user that may require more log space than the allocated maximum amount may not be accepted for processing.

At step 320, a workload submitted by the user is preprocessed to estimate the log space required to process the workload. The required log space may, for example, be estimated by using the methods described hereinbefore with reference to FIGS. 1 and 2.

At step 330, a determination is made whether the allocated log space amount is greater than the estimated log space requirement. If so (Y), the workload or transaction is processed at step 340. If not (N), the workload or transaction is rejected and an appropriate message is generated at step 350. The message may include the estimated log space requirement to enable the user to request a policy change (e.g., an increase in his/her allocated maximum log space amount) for efficiently scheduling the workload.

Figure 4:
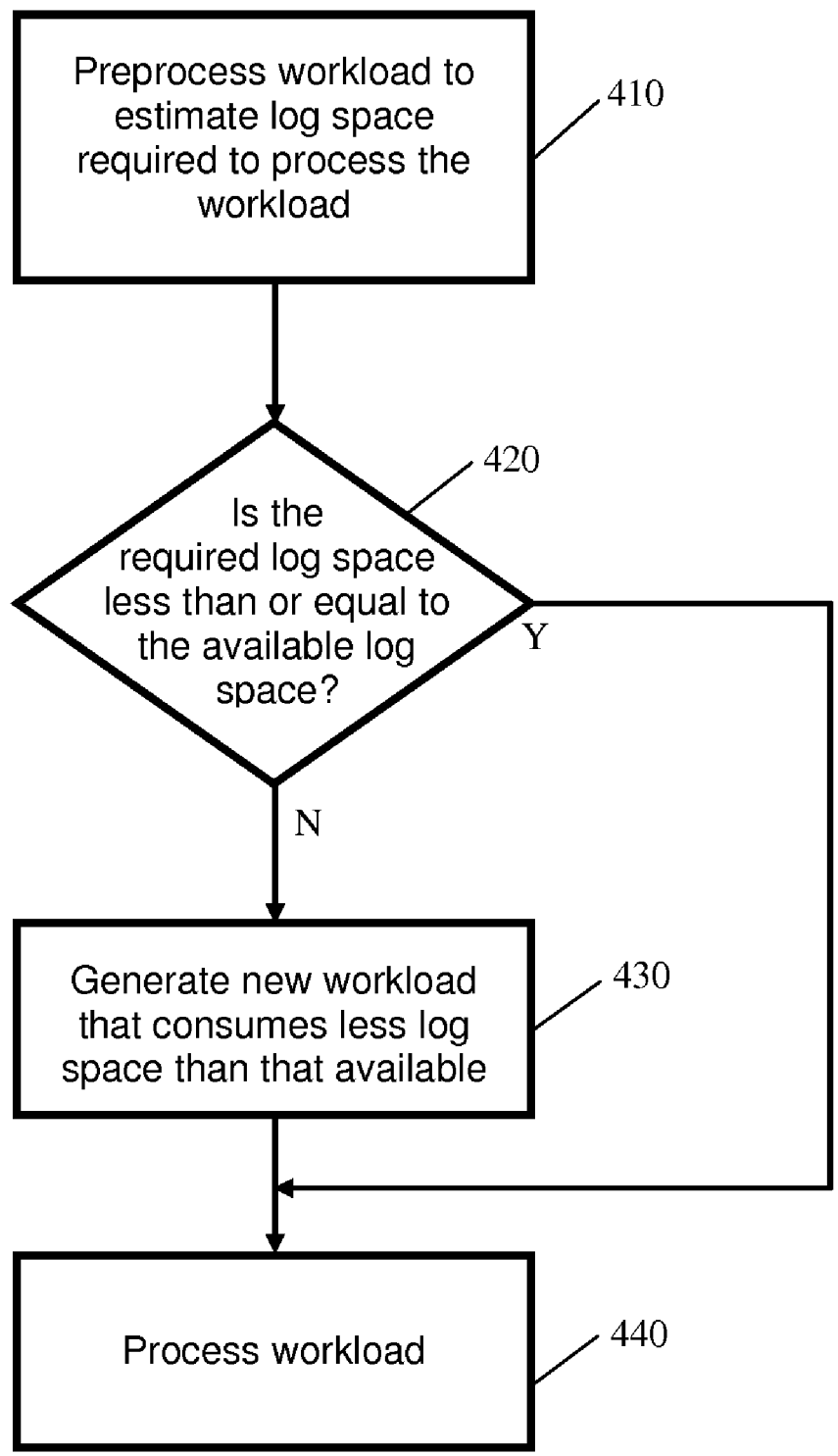
FIG. 4 is a flow diagram of another method for managing log space in a computer database.

FIG. 4 is a flow diagram of a method for managing log space in a database, and is of particular relevance to computer database systems in which the amount of available log space is limited, for example, due to limited availability of data storage space.

At step 410, a workload to be submitted to a DBMS is preprocessed to estimate the log space required to process the workload. The required log space may, for example, be estimated using the methods described hereinbefore with reference to FIGS. 1 and 2.

At step 420, a determination is made whether the estimated log space requirement is less than an available log space amount. If not (N), processing continues at step 430. If so (Y), the workload is processed at step 440.

At step 430, a new workload is generated that will consume less log space than the amount of log space available (or an equivalent amount). The new workload comprises each query in the original workload and maintains the semantics of the original queries. For example, a transaction comprising two queries that have to be executed sequentially will not be fragmented and the new workload will respect the order of execution of the queries. The new workload or transaction may comprise some additional temporal information relating to scheduling. For example:

The new workload or transaction may comprise at least one keyword for specifying when to flush the log transactions and thus release log space. Such a keyword may, for example, comprise a "commitcount" for the import API of IBM DB2™, which specifies execution of a commit after every 'n' insertion in a database table.

The starting point of the new workload or transaction may be rescheduled to take advantage of the parallel processing capabilities of the database engine. For instance, it may be advantageous to execute 3 queries requiring relatively little log space in parallel followed by a single query which, in terms of the log space requirement estimate, requires a relatively larger amount of log space.

The new workload is processed at step 440.

Figure 5:
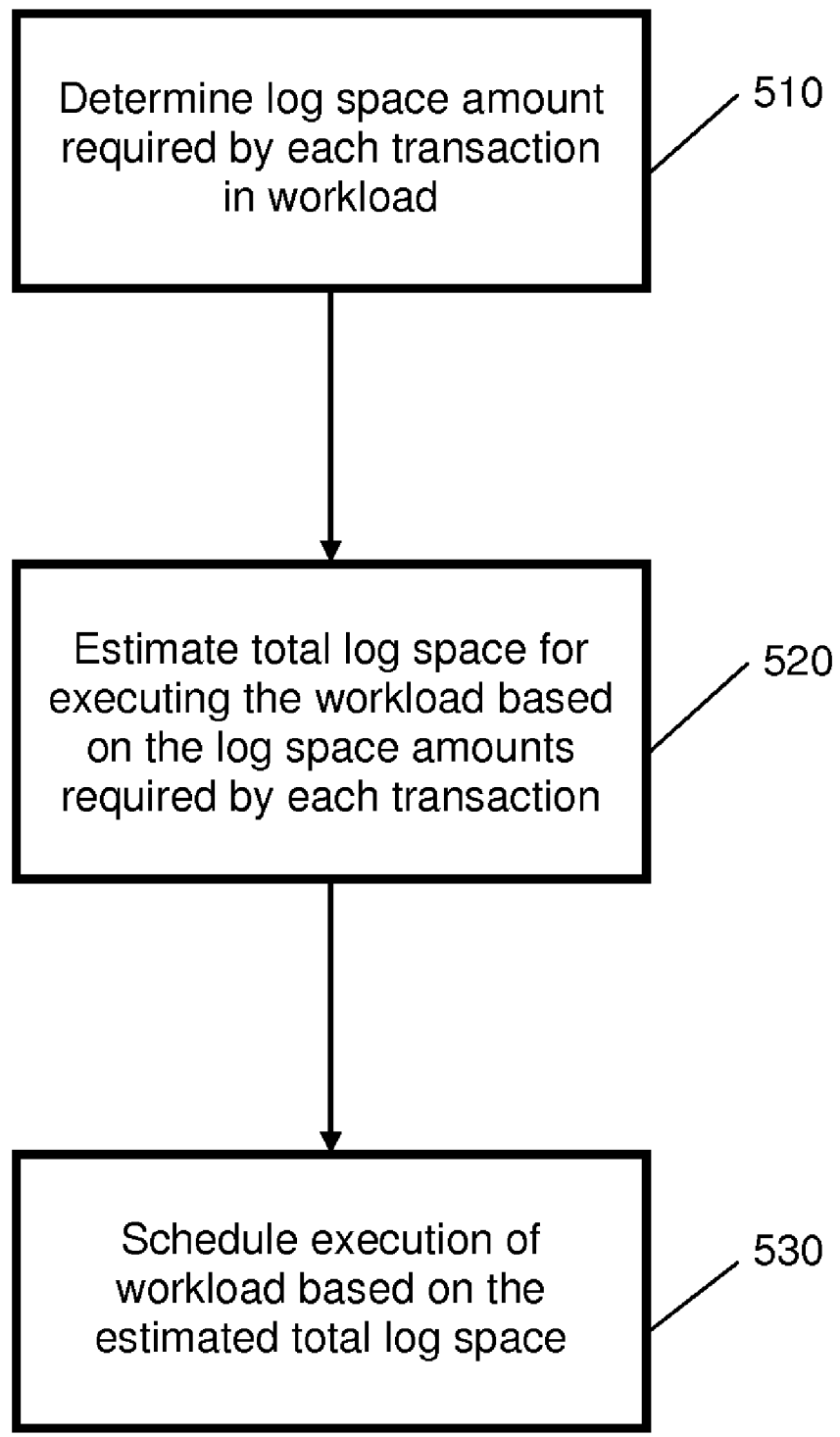
FIG. 5 is a flow diagram of a method for scheduling a workload comprising a plurality of transactions relating to a database management system.

FIG. 5 is a flow diagram of a method for scheduling a workload comprising a plurality of transactions relating to a database management system. The transactions typically comprise one or more queries on the database management system.

At step 510, a log space amount required by each transaction in the workload is determined. The required log space may, for example, be estimated using the methods described hereinbefore with reference to FIGS. 1 and 2.

At step 520, the total log space required for executing the workload is estimated based on the log space amounts required by each transaction.

At step 530, execution of the workload is scheduled based on the estimated total log space. Scheduling execution of a workload may comprise determining a time to execute each of the transactions in the workload.

The method may comprise the further step of determining an available amount of log space. Execution of the transactions may be scheduled such that the estimated total log space required for executing the workload is less than the amount of available log space.

The execution time of a transaction can generally be estimated using built-in features of the DBMS. For example, Microsoft's SQL Server™ provides execution time in seconds or milliseconds and Query Plan in IBM's DB2™ Universal Database provides execution time in timerons. This information is freely available to users.

An example of a scheduling constraint is presented hereinafter:

Transaction A: Q1, Q2, Q3
Transaction B: Create index on Table A (with) attribute A1
Transaction C: Remove index on Table A (with) attribute A2
Original schedule: start transaction A, start transactions B and C
Revised schedule: start transaction A, start transaction B, start transaction C According to the revised schedule above, transaction C will only be started once transaction B has been completed. A more complex example might start transaction C when transaction B is 75% complete. Once the required log space is estimated or known and a scheduling constraint has been generated, a standard scheduling algorithm may be used to determine the start and/or overlap of the various transactions in a workload. Scheduling constraints typically relate to changing the order of processing transactions or delaying processing of transactions. The foregoing description assumes that the transactions are independent of one another (i.e., the sequence of execution of the transactions has no influence on the result of the transactions). However, those skilled in the relevant art will appreciate that rescheduling of dependent transactions can also be practiced. For example, dependent transactions may be rescheduled by an algorithm for that purpose (such algorithms are known in the art) or a user may be requested to provide multiple sets of independent transactions (possibilities).

Figure 6:
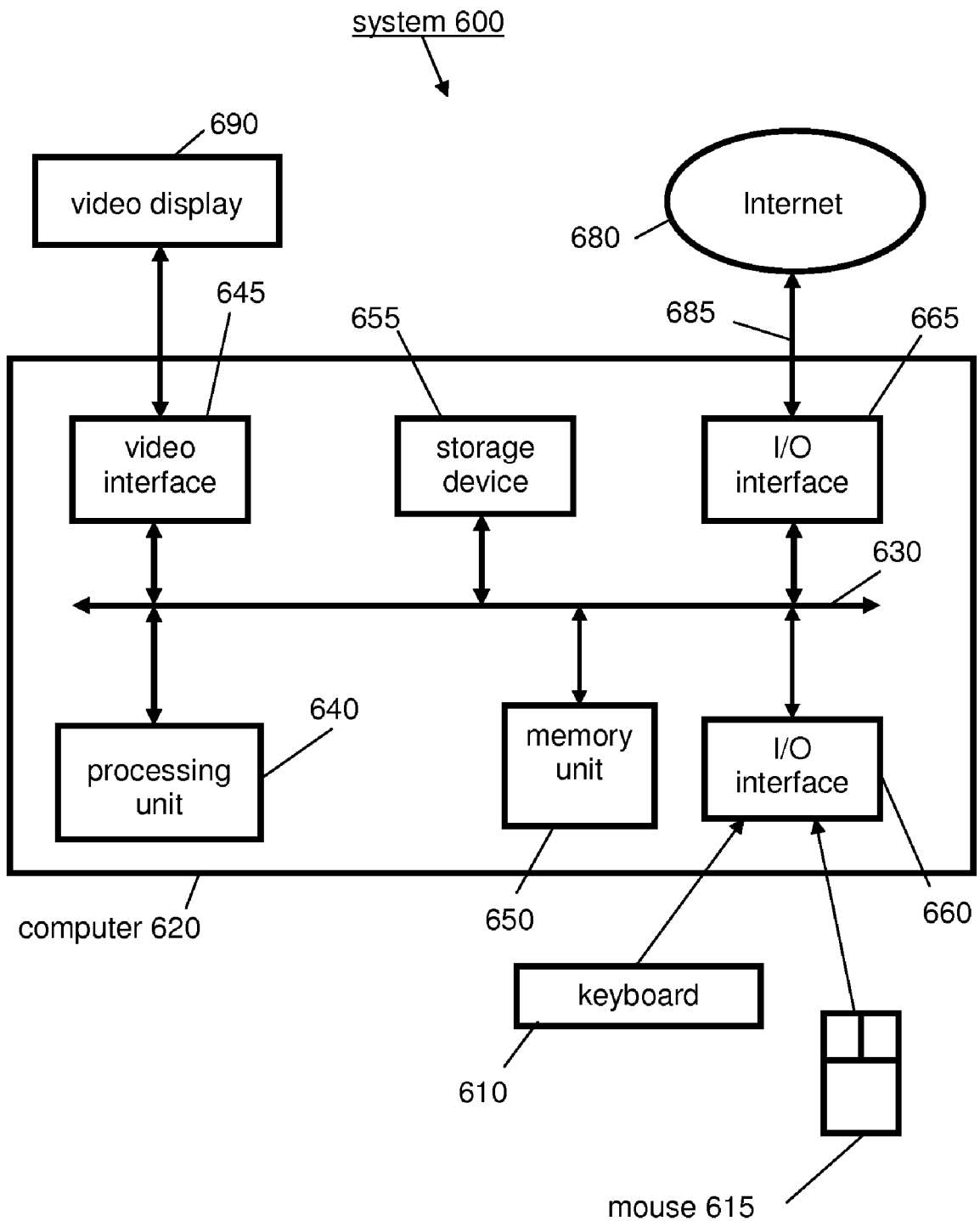
FIG. 6 is a schematic block diagram of a computer system with which embodiments of the present invention may be practised.

FIG. 6 shows a schematic block diagram of a system 600 that can be used to practice the methods described herein. More specifically, the system 600 is provided for executing computer software that is programmed to assist in performing methods for determining an amount of log space required for executing a workload, methods for managing log space in computer databases, and methods for scheduling a workload comprising a plurality of transactions relating to a database management system.

The computer software typically executes under an operating system such as MS Windows 2000, MS Windows XP™ or Linux™ installed on the system 600.

The computer software involves a set of programmed logic instructions that may be executed by the system 600 for instructing the system 600 to perform predetermined functions specified by those instructions. The computer software may be expressed or recorded in any language, code or notation that comprises a set of instructions intended to cause a compatible information processing system to perform particular functions, either directly or after conversion to another language, code or notation.

The computer software program comprises statements in a computer language. The computer software program may be processed using a compiler into a binary format suitable for execution by the operating system. The computer software program is programmed in a manner that involves various software components, or code, that perform particular steps of the methods described hereinbefore.

The components of the system 600 comprise: a computing device 620, input devices 610, 615 and a video display 690. The computing device 620 comprises: a processing unit 640, a memory unit 650, an input/output (I/O) interface 660, a communications interface 665, a video interface 645, and a storage device 655. The computing device 620 may comprise more than one of any of the foregoing units, interfaces, and devices.

The processing unit 640 may comprise one or more processors that execute the operating system and the computer software executing under the operating system. The memory unit 650 may comprise random access memory (RAM), read-only memory (ROM), flash memory and/or any other type of memory known in the art for use under direction of the processing unit 640.

The video interface 645 is connected to the video display 690 and provides video signals for display on the video display 690. User input to operate the computer 620 is provided via the input devices 610 and 615, comprising a keyboard and a mouse, respectively. The storage device 655 may comprise a disk drive or any other suitable non-volatile storage medium and may be used for storing log information in accordance with embodiments of the present invention.

Each of the components of the computing device 620 is connected to a bus 630 that comprises data, address, and control buses, to allow the components to communicate with each other via the bus 630.

The system 600 may be connected to one or more other similar computers via the communications interface 665 using a communication channel 685 to a network 680, represented as the Internet.

The computer software program may be provided as a computer program product, and recorded on a portable storage medium. In this case, the computer software program is accessible by the system 600 from the storage device 655. Alternatively, the computer software may be accessible directly from the network 680 by the computing device 620. In either case, a user can interact with the system 600 using the keyboard 610 and mouse 615 to operate the programmed computer software executing on the computing device 620.

The system 600 has been described for illustrative purposes and is an example of a particular type of system that is suitable for practicing the methods and computer program products described hereinbefore. However, those skilled in the computer and/or programming arts would readily appreciate that numerous alternative configurations or types of system may be used to practice the methods and computer program products described hereinbefore, including a personal computer (PC), a workstation, a personal digital assistant (PDA) or a mobile telephone, The foregoing detailed description provides exemplary embodiments only, and is not intended to limit the scope, applicability or configurations of the invention. Rather, the description of the exemplary embodiments provides those skilled in the art with enabling descriptions for implementing an embodiment of the invention. Various changes may be made in the function and arrangement of elements without departing from the spirit and scope of the invention as set forth in the claims hereinafter.

Where specific features, elements and steps referred to herein have known equivalents in the art to which the invention relates, such known equivalents are deemed to be incorporated herein as if individually set forth. Furthermore, features, elements and steps referred to in respect of particular embodiments may optionally form part of any of the other embodiments unless explicitly stated to the contrary.

We claim:

1. A computer-implemented method for scheduling a workload comprising a plurality of transactions relating to a database management system, said method comprising the steps of:

determining an available amount of transaction log space, determining a transaction log space amount required by each transaction in said workload;

estimating the total transaction log space required for executing said workload based on the transaction log space amounts required by each transaction;

scheduling execution of said workload on said database management system based on said estimated total required transaction log space, wherein the transaction log space remains unchanged; and executing said workload on said database management system, wherein said transactions comprise one or more queries on said database management system, wherein the transaction log space amounts required by said transactions are determined based on a learned model, wherein said step of scheduling execution of said workload comprises scheduling execution of each transaction in said workload, wherein said step of scheduling execution of said workload comprises determining a time to execute each of said transactions, and wherein execution of said transactions is scheduled such that the estimated total transaction log space required for executing said workload is less than said amount of available transaction log space.

* * * * *